United States Patent
Ono et al.

(10) Patent No.: US 8,346,378 B2
(45) Date of Patent: Jan. 1, 2013

(54) PROGRAMMABLE CONTROLLER

(75) Inventors: Akio Ono, Moriyama (JP); Atsuko Takahashi, Otsu (JP)

(73) Assignee: Omron Corporation, Kyoto (JP)

( * ) Notice: Subject to any disclaimer, the term of this patent is extended or adjusted under 35 U.S.C. 154(b) by 450 days.

(21) Appl. No.: 12/646,569

(22) Filed: Dec. 23, 2009

(65) Prior Publication Data

US 2010/0174387 A1 Jul. 8, 2010

(30) Foreign Application Priority Data

Dec. 26, 2008 (JP) ............................. P2008-335257
Dec. 10, 2009 (JP) ............................. P2009-280843

(51) Int. Cl.
*G05B 11/01* (2006.01)
(52) U.S. Cl. ........................ 700/23; 700/11; 700/18
(58) Field of Classification Search ............. 700/10–14, 700/17–20, 23–25, 27
See application file for complete search history.

(56) References Cited

U.S. PATENT DOCUMENTS

| | | | | |
|---|---|---|---|---|
| 5,392,444 A | * | 2/1995 | Inoue | 718/104 |
| 5,911,083 A | * | 6/1999 | Kuslak | 712/41 |
| 5,940,628 A | * | 8/1999 | Seno | 710/59 |
| 6,449,515 B2 | * | 9/2002 | Imoto | 700/23 |
| 7,024,495 B2 | * | 4/2006 | Okada | 710/22 |
| 7,568,198 B2 | * | 7/2009 | Chandhoke | 718/103 |

FOREIGN PATENT DOCUMENTS

| JP | 02196305 A | * | 8/1990 |
|---|---|---|---|
| JP | 2000-105604 A | | 4/2000 |

OTHER PUBLICATIONS

Jones, C.T.; Step 7 in 7 Steps; Practical Guide to Implementing S7-300/S7-400 Programmable Logic Controllers; XP-002574901; Jan. 1, 2006; pp. 2-3, 26-29, 56-59, 146-165, 186-187, 194-199, 298, 304-305; Patric-Turner Publishing.
Siemens AG, Applications & Tools, PCT-based Automation with SIMATIC WinAC—Configuration and Operation of WinCC and Tuning of WinAC RTX, V 1.0; Jul. 28, 2004; pp. 1-44.
European Patent Office; Communication pursuant to Article 94(3) EPC dated Mar. 10, 2011; 9 pages.

* cited by examiner

*Primary Examiner* — Kakali Chaki
*Assistant Examiner* — Darrin Dunn
(74) *Attorney, Agent, or Firm* — Foley & Lardner LLP

(57) ABSTRACT

The value of fixed cycle time is adjusted to an optimum value in a short period of time. In a second operational mode (MON) of a PLC, a series of a plurality of system processes are repeatedly performed with a change to a user program in a peripheral service process being allowed. A change to fixed cycle time to be compared with actual cycle time is prohibited in a first operational mode (RUN) but is allowed in the second operational mode (MON) and a non-operational mode (PRG).

9 Claims, 13 Drawing Sheets

CONFIGURATION DIAGRAM OF PLC TO WHICH THE PRESENT INVENTION IS APPLIED

GENERAL FLOWCHART SCHEMATICALLY SHOWING ENTIRE SYSTEM PROGRAM

DETAILED FLOWCHART (CASE 1) OF TIME ADJUSTMENT PROCESS

DETAILED FLOWCHART (CASE 2) OF TIME ADJUSTMENT PROCESS

DETAILED FLOWCHART SHOWING PROCESS
OF SETTING SET VALUE OF FIXED CYCLE TIME BY TOOL

DETAILED FLOWCHART SHOWING PROCESS
OF REWRITING SET VALUE OF FIXED CYCLE TIME BY PLC

FIG. 9

| CHANGING TIMING | CONTENTS |
|---|---|
| (A) FIXED TO A VALUE OBTAINED AT THE TIME OF SETTING | FIXED TO VALUE OBTAINED WHEN USER PERFORMS SETTING |
| (B) CHANGE ACCORDING TO THE ACTUAL CYCLE TIME | PLC DYNAMICALLY CHANGES VALUE ACCORDING TO USER-SPECIFIED CONDITIONS |

(a) CHANGING TIMING OF SET VALUE OF FIXED CYCLE TIME

| COMPUTATION METHOD | CONTENTS |
|---|---|
| USER'S ARBITRARY VALUE | VALUE INPUTTED BY USER AS SET VALUE |
| MAXIMUM VALUE FROM THE PAST | MAXIMUM ACTUAL CYCLE TIME INCLUDES CASE IN WHICH ACTUAL CYCLE TIME HAS UNEXPECTEDLY INCREASED |
| MAXIMUM VALUE AMONG REFERENCE VALUES | CASE IN WHICH ACTUAL CYCLE TIME HAS UNEXPECTEDLY INCREASED IS EXCLUDED; FOR EXAMPLE, MAXIMUM VALUE IN RANGE OF VALUES WITHIN WHICH 90% OF SAMPLE VALUES OBTAINED IN PAST 500 CYCLES FALL |

(b) COMPUTATION METHOD OF SET VALUE OF FIXED CYCLE TIME

DIAGRAM SHOWING, IN TABLE FORMAT, CHANGING TIMINGS AND COMPUTATION METHODS OF SET VALUE OF FIXED CYCLE TIME

FIG. 11

| OPERATING MODE OF PLC | INPUT/OUTPUT REFRESH | USER PROGRAM EXECUTION | CHANGE TO "USER PROGRAM" | STATE OF CONTROL TARGET DEVICE |
|---|---|---|---|---|
| RUN MODE | YES | YES | NOT ALLOWED | OPERATING STATE |
| MON MODE | YES | YES | ALLOWED | |
| PRG MODE | YES | NO | ALLOWED | STOP STATE |

COMPARATIVE TABLE BETWEEN OPERATING MODES OF PLC

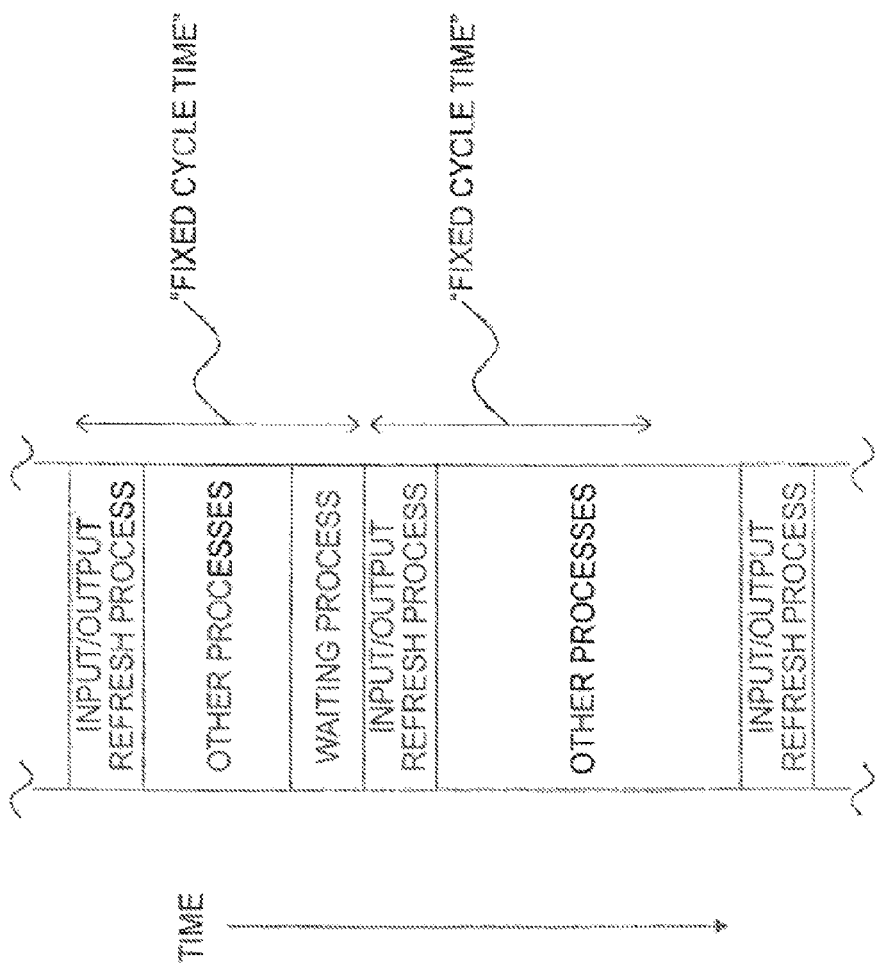

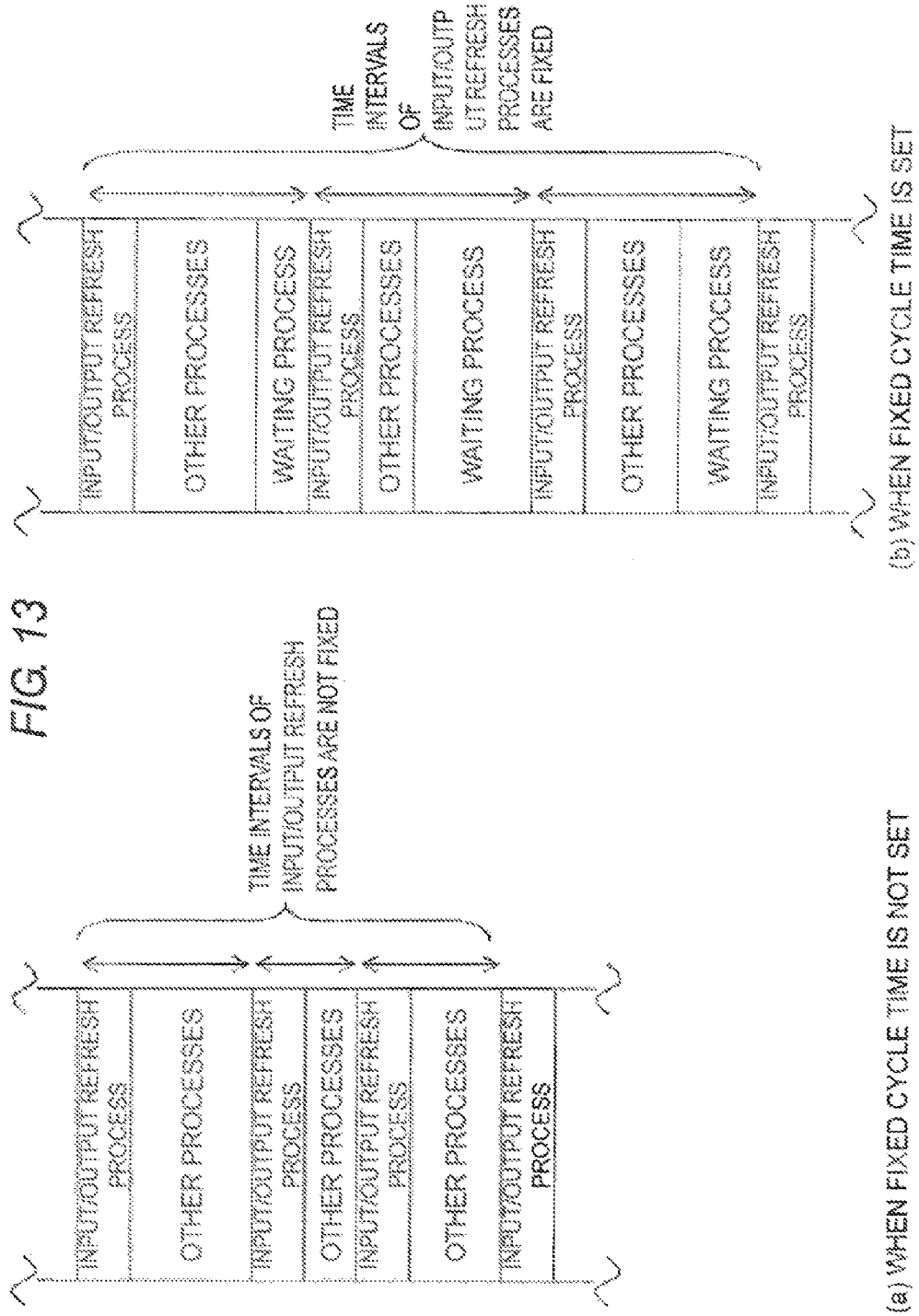

PROGRAMMABLE CONTROLLER

BACKGROUND OF THE INVENTION

This application is based on Japanese Patent Applications No. 2008-335257 filed with the Japan Patent Office on Dec. 26, 2008, and No. 2009-280843 filed with the Japan Patent Office on Dec. 10, 2009, the entire contents of which are hereby incorporated by reference.

TECHNICAL FIELD

The present invention relates to a programmable controller and more particularly to a programmable controller having the function of achieving fixed execution time intervals of sequential input/output refresh processes, regardless of factors such as a change in the required execution time of a user program.

RELATED ART

In a programmable controller, a series of system processes such as an input/output refresh process, a common process, a user program execution process, and a peripheral service process are cyclically performed. Required execution time during which the series of system processes go through a loop is normally referred to as the scan time or cycle time. In the following, the required execution time is referred to as the "cycle time".

As is well known by those skilled in the art, during operation of a programmable controller, the value of cycle time is not always fixed between cycles due to various factors. One of the factors is that the required execution time of a user program varies between different conditions of a control target device at different times.

A change in cycle time indicates a change in the execution time intervals of sequential input/output refresh processes (see FIG. 13A). In an input/output refresh process, a process of capturing input data from an input unit, writing the input data to an input data storage area in a predetermined memory of a programmable controller, and outputting output data stored in an output data area in the predetermined memory to an output unit is performed. A change in the execution time intervals of sequential input/output refresh processes directly leads to a change in input/output response time (the time from when the input unit receives a signal from an external device to when the output unit outputs results of execution of a user program based on the signal to the external device).

In control using a programmable controller, there has been a demand from the past for making cycle times that influence a change in the input/output response time fixed as much as possible (see, for example, Japanese Unexamined Patent Publication No. 2000-105604).

In view of this, a programmable controller is known that has the function of forcefully making cycle times fixed regardless of factors such as a change in the required execution time of a user program (see FIG. 13B). Note that other processes in FIGS. 13A and 13B include a common process, a user program execution process, a peripheral service process, etc.

In this type of programmable controller having the function of making cycle times fixed, the setting of a target cycle time to be fixed (hereinafter, referred to as the "fixed cycle time") is enabled. The value of fixed cycle time is set to a value somewhat higher than the value of actual cycle time (actual required execution time during which a series of system processes go through a loop) which is estimated during operation of the programmable controller.

When the actual cycle time is shorter than the fixed cycle time, waiting time, the amount of which corresponds to a difference between the actual cycle time and the fixed cycle time, is provided. When actual cycle time in a certain cycle is longer than the fixed cycle time due to factors such as unexpected control conditions, the fixed cycle time is ignored in the cycle (see FIG. 12). Note that other processes in FIG. 12 include a common process, a user program execution process, a peripheral service process, etc.

As such, the function of making cycle times fixed does not completely make cycle times fixed between cycles. When actual cycle time exceeds set fixed cycle time, in a corresponding cycle a system process (e.g., a peripheral service process) being performed at that point in time is not aborted but is continuously performed, exceeding the fixed cycle time. This is based on consideration of design that forcefully terminating the system process being performed rather causes inconveniences.

The operating modes of the programmable controller include a first operating mode in which a user program is executed and based on results of the execution a control target device operates in a desired operating fashion; and a second operating mode in which a user program is not executed.

Conventionally, the setting of fixed cycle time is enabled only in the second operating mode and is disabled in the first operating mode.

This is based on historical background such as (1) an optimum value of fixed cycle time can be predicted somewhat correctly at the time of designing a user program without performing a measurement while actually operating a control target device, (2) since the setting or a change to the setting of fixed cycle time is normally performed, for example, at the time of installing a control target device or the time of updating a user program, it is sufficient that operations for the setting be performed in a state in which the control target device is stopped, and (3) since it is sufficient for cycle times to be fixed in a certain range and thus the magnitude of the values of the cycle times in a strict sense is not so problematic, there is not much need to frequently make a change to the setting of fixed cycle time during operation of a control target device.

SUMMARY

Nowadays, due to complication, an increase in speed, etc., of control target devices, there is a tendency to seek the optimization of the value of fixed cycle time itself to increase the throughput of the control target devices to increase productivity.

In addition, in a recent programmable controller that connects a programmable display, a remote I/O device, a plurality of other programmable controllers, etc., over a network, it may be difficult, due to various event interrupts, etc., to uniquely estimate the value of actual cycle time only by the size of a user program installed on the programmable controller.

Therefore, in a conventional programmable controller, to optimize the value of fixed cycle time, there is a need to repeat activities again and again that every time temporary setting of fixed cycle time is performed with the operating mode being set to the second operating mode, the operating mode is switched to the first operating mode and a control target device is put on test run while a user program is executed and the operation state of the control target device is checked.

However, generally, in a programmable controller, to switch a control target device from an operating state to a stop state by switching the operating mode from the first operating mode to the second operating mode, prior to the switching to the second operating mode, an interlock program for predetermined pre-processing operations (processing operations such as taking out work in a heating furnace and bringing products on the line back to the original position) on the control target device side is normally performed in the first operating mode in consideration of prevention of danger, etc. Therefore, the switching from the operating state to the stop state normally requires some amount of time.

Hence, in a conventional programmable controller, to optimize the value of fixed cycle time, the control target device side repeats switching between an operating state and a stop state again and again, causing a problem that a considerable amount of time is required.

The present invention has been devised to solve the problems described above, and an object thereof is to provide a programmable controller capable of adjusting the value of fixed cycle time to an optimum value in a short period of time.

Other objects and functions and effects of the present invention will be easily understood by those skilled in the art by referring to the following description provided herein.

The above-described technical problems are considered to be solved by a programmable controller having the following configuration.

That is, this programmable controller includes: an external input/output unit connected to a control target device; a user memory that stores a user program which is required to operate the control target device in a desired operating fashion; an input/output memory that stores input/output data corresponding to external input/output signals from/to the external input/output unit; and a system memory having stored therein a system program for implementing functionality as the programmable controller.

The system program stored in the system memory includes a series of a plurality of system processes to be repeatedly performed, and the plurality of system processes include at least an input/output refresh process, a user program execution process, and a peripheral service process.

In the input/output refresh process, input data is captured from the external input/output unit and the input data is written to an input data storage area of the input/output memory, and output data is loaded from an output data storage area of the input/output memory and the output data is sent into the external input/output unit.

In the user program execution process, instructions which form the user program are sequentially read from the user memory, and the instructions are executed by referring to the input data in the input/output memory and the output data in the input/output memory is rewritten based on results of the execution.

The peripheral service process includes a process of allowing a change to the user program in response to a command coming from a predetermined tool apparatus through communication.

As an operating mode, an operational mode in which the control target device can operate and a non-operational mode in which the control target device cannot operate are prepared.

In the operational mode, the series of a plurality of system processes are repeatedly performed.

In the non-operational mode, the series of a plurality of system processes except for at least the user program execution process are repeatedly performed.

The system program further includes a time adjustment process including: a measurement process in which, when the series of a plurality of system processes are repeatedly performed, elapsed time from a start of the input/output refresh process to completion of a system process to be performed immediately previous to a next input/output refresh process is measured as actual cycle time; a determination process in which a comparison is made between the actual cycle time measured in the measurement process and predetermined fixed cycle time to determine which one of them is greater; and a selection delaying process in which when it is determined in the determination process that the fixed cycle time is greater than the actual cycle time, a point in time at which the next input/output refresh process starts is delayed by an amount of time corresponding to a difference between the times, and when it is determined in the determination process that the actual cycle time is greater than the fixed cycle time, the next input/output refresh process immediately starts.

A change to the fixed cycle time to be compared with the actual cycle time is allowed not only in the non-operational mode but also in the operational mode.

As the operational mode, a first operational mode and a second operational mode are prepared.

In the first operational mode (RUN), the series of a plurality of system processes are repeatedly performed with a change to the user program in the peripheral service process being not allowed.

In the second operational mode (MON), the series of a plurality of system processes are repeatedly performed with a change to the user program in the peripheral service process being allowed, In the non-operational mode (PRG), the series of a plurality of system processes except for at least the user program execution process are repeatedly performed with a change to the user program in the peripheral service process being allowed, and Further, a change to the fixed cycle time to be compared with the actual cycle time is prohibited in the first operational mode but is allowed in the second operational mode and the non-operational mode.

According to a programmable controller having such a configuration, in the second operational mode, a series of a plurality of system processes including an input/output refresh process, a user program execution process, and a peripheral service process are repeatedly performed with a change to a user program in the peripheral service process being allowed. Moreover, in the second operational mode, a change to the fixed cycle time to be compared with the actual cycle time is also allowed.

Therefore, with a control target device being put in a test run state, while the fixed cycle time is minutely adjusted by operating an operating device such as a tool apparatus or a programmable display, for example, the value of an appropriate parameter correlated to the throughput of the control target device is monitored, whereby fixed cycle time at which the control target device side can obtain optimum throughput can be found and set as new fixed cycle time.

At that time, by also using the function of rewriting a user program (e.g., so-called online editing, etc.) or the function of rewriting the input/output memory (e.g., a forced set/reset operation of input/output data, etc.), the user program can be modified so that the control target device side can obtain optimum throughput.

Moreover, since the above-described change operation to the fixed cycle time can be performed with the control target device maintaining an operating state (test run), unlike traditional programmable controllers, there is no need to switch the control target device between an operating state and a stop state every time a change operation is performed. Accordingly, there is also no need to perform time-consuming pre-processing operations which are associated with switching from an operating state to a stop state, enabling to accomplish the optimization of the fixed cycle time in a short period of time.

Note that a technique is already publicly known in which while a comparison result between fixed cycle time and actual cycle time is reflected in an predetermined internal flag (which is present in the input/output memory, for example) the comparison result is monitored through a tool apparatus, and thus, according to the present invention, by using such a technique, while minutely adjusting the fixed cycle time during operation, an influence thereby is checked, whereby fixed cycle time which is optimum also in terms of an improvement in input/output responsiveness can be found.

Here, the fixed cycle time to be compared with the actual cycle time can be changed to new fixed cycle time which is inputted from an external source through communication or a predetermined operating unit.

According to such a configuration, by sending in new fixed cycle time from an operating unit provided to the programmable controller or a tool apparatus (a personal computer, a programmable display, etc.) or other programmable controllers connected through communication, the setting of the fixed cycle time can be changed.

Note that, there are various ideas for when the new fixed cycle time thus sent in is actually reflected in a comparison operation with actual cycle time. According to the normal idea, the new fixed cycle time may be reflected immediately at the point in time when the new fixed cycle time is sent in (from a next operating cycle). Other ideas include predetermined timing (e.g., timing at which another reflection instruction operation is performed, temporally set timing, timing at which a specific system process is performed, etc.).

Further, a change to the fixed cycle time to be compared with the actual cycle time can be changed to new fixed cycle time which is automatically generated in the programmable controller in accordance with a predetermined algorithm According to such a configuration, by arbitrarily adopting, as the algorithm, an algorithm suitable for a certain programmable controller or suitable for a certain control target device, different fixed cycle times suitable for different control states at different times can be set.

Note that, there are various ideas depending on how the internal generation operation is performed for when the new fixed cycle time thus generated internally is actually reflected in a comparison operation with actual cycle time.

When the internal generation operation is performed in a single-shot manner, new fixed cycle time may be reflected immediately at timing at which the internal generation operation is performed or may be reflected, as with the above-described case, at predetermined timing (e.g., timing at which another reflection instruction operation is performed, temporally set timing, timing at which a specific system process is performed, etc.). According to such a configuration, different fixed cycle time suitable for different control states at different times can be set, depending on when or what cycle or frequency the internal generation operation is performed.

When the internal generation operation is continuously or intermittently performed, new fixed cycle time may be reflected at each timing at which the internal generation operation is performed (in other words, dynamically). According to such a configuration, different fixed cycle time suitable for different control states at different times can be set at all times.

As the predetermined algorithm, new cycle time is generated, based on a maximum value among sample values of the actual cycle time for a certain period of time or a certain number of cycles in past.

According to such a configuration, when, for example, a user program is partially rewritten (added) by online editing, the setting can be automatically changed to fixed cycle time that is suitable for a new user program obtained after the rewrite, which saves the user from having to perform an operation to rewrite the fixed cycle time each time an online editing operation is performed.

In this case, a sample value that is out of predetermined reference values may be excluded from the sample values of the actual cycle time for a certain period of time or a certain number of cycles in past.

According to such a configuration, inconvenience can be avoided that an abnormal maximum value happens to be included as a sample value due to an unexpected, low-frequency event interrupt, etc., and the value of fixed cycle time is unnecessarily and automatically set to a too high value, whereby input/output responsiveness is extremely impaired.

Note that the programmable controller of the present invention described above includes both an all-in-one type in which all basic elements such as a computing unit, an input/output unit, and a communication unit are contained in a common casing; and a building block type in which basic elements such as a computing unit, an input/output unit, and a communication unit are respectively contained in dedicated casings.

Although the contents of a peripheral service process vary a little depending on whether a programmable controller is of the all-in-one type or the building block type, generally, the peripheral service process includes an operating unit responding process in which the exchange of commands or data is performed with an operating unit provided to the programmable controller or with a tool apparatus connected through communication; a process of performing batch or event-based transmission and reception of input/output data with other programmable controllers connected through communication; a process of performing batch or event-based transmission and reception with a slave (remote I/O apparatus) connected through communication; etc.

In each of the above-described operating modes, control to selectively allow a change to a user program in a peripheral service process can be easily implemented by, for example, selectively performing a process for a relevant rewrite instruction command in each mode in the above-described operating unit responding process.

As another means for solving the problems, the input/output refresh process may be divided into an input refresh process in which input data is captured from the external input/output unit and written to the input data storage area of the input/output memory; and an output refresh process in which output data is loaded from the output data storage area of the input/output memory and sent into the external input/output unit. The series of a plurality of system processes in this case include an input refresh process, an output refresh process, a common process, a user program execution process, and a peripheral service process. The order of the input refresh process and the output refresh process may be reversed and another system process may be included between the processes.

In this case, in the measurement process, when the series of a plurality of system processes are repeatedly performed, elapsed time from a start of the output refresh process to completion of a system process to be performed immediately previous to a next output refresh process is measured as actual cycle time.

Further, in the selection delaying process, when it is determined in the determination process that the fixed cycle time is greater than the actual cycle time a point in time at which the next output refresh process starts is delayed by an amount of time corresponding to a difference between the times, and when it is determined in the determination process that the actual cycle time is greater than the fixed cycle time the next output refresh process immediately starts.

According to such a configuration, the setting of fixed cycle time for optimizing the execution time intervals of output refresh processes can be performed during operation.

As is clear from the above description, according to the present invention, with a control target device being put in a test run state, while the fixed cycle time is minutely adjusted, fixed cycle time at which the control target device side can obtain optimum throughput can be found and set as new fixed cycle time.

BRIEF DESCRIPTION OF THE DRAWINGS

FIGS. 9A and 9B are diagrams showing, in a table format, the changing timings and computation methods of the set value of fixed cycle time;

FIG. 11 is a comparative table between the operating modes of the PLC;

FIG. 12 is a diagram showing the details of operations performed when fixed cycle time is set; and FIGS. 13A and 13B are diagrams describing a difference in operation between when fixed cycle time is set and when not set.

DETAILED DESCRIPTION

Hereinafter, a preferred embodiment of a programmable controller system according to the present invention will be described in detail with reference to the accompanying drawings.

Figure 1:
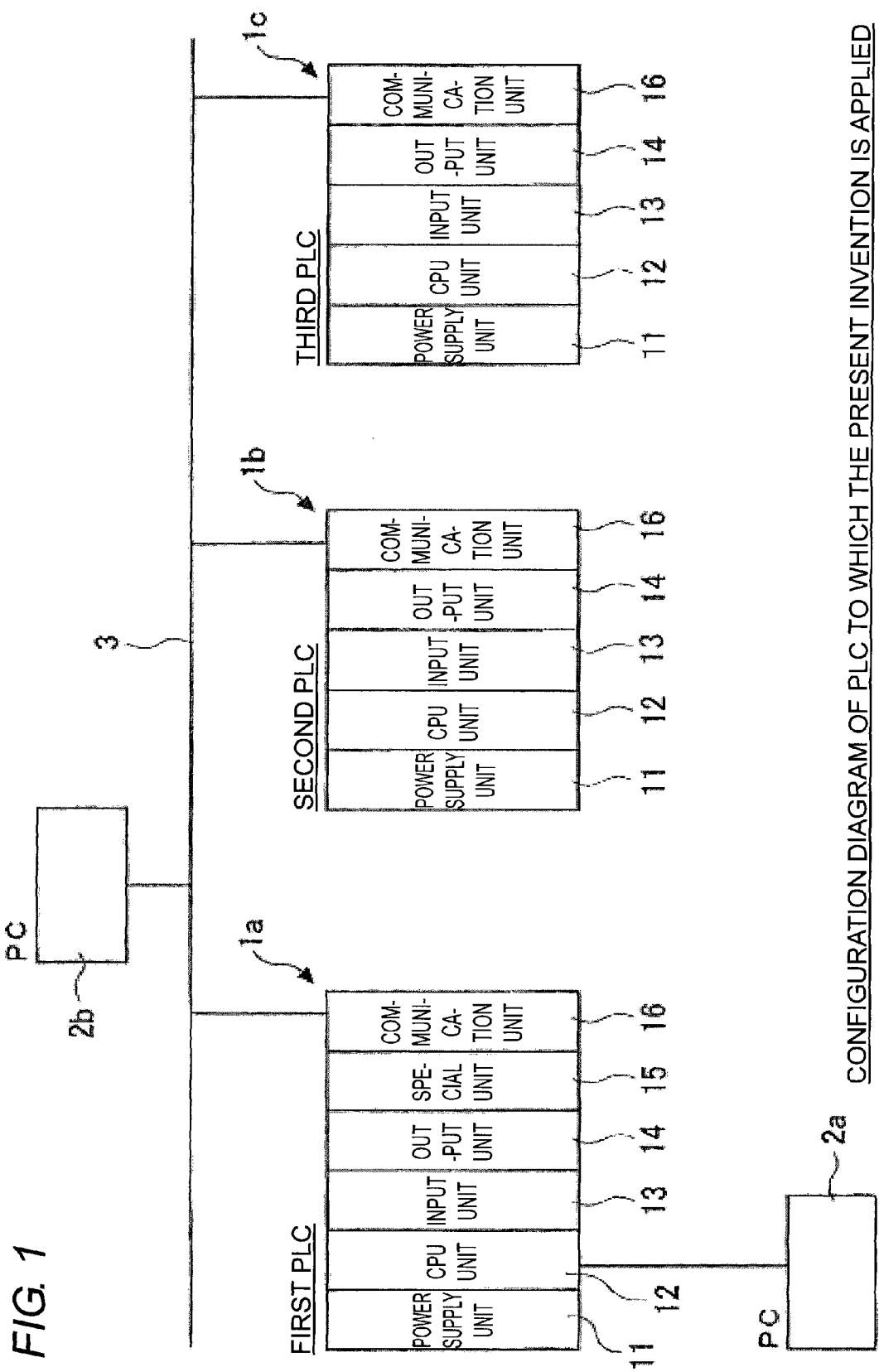
FIG. 1 is a configuration diagram of PLCs to which the present invention is applied.

A configuration diagram of a PLC system to which the present invention is applied is shown in FIG. 1. The system includes a plurality of PLCs 1 and a PC 2b which are connected to each other over a network 3. Each of the PLCs 1 includes a power supply unit 11, a CPU unit 12, an input unit 13, an output unit 14, a special unit 15, and a communication unit 16. A PC 2a and the CPU unit 12 may be directly connected to each other to allow data communication therebetween. The power supply unit 11 is a unit that supplies power to the entire PLC 1. The CPU unit 12 is a unit that controls the entire PLC. When some input is made from a control target device, an input signal corresponding to the input is obtained through the input unit 13 and is processed by the CPU unit 12. When the PLC 1 controls the control target device, the PLC 1 is connected to the control target device through the output unit 14.

The special unit 15 is an add-on unit such as a motion control unit or a PID computing unit and is provided as necessary. In FIG. 1, the special unit 15 is provided only to a first PLC 1a and is not provided to a second PLC 1b or a third PLC 1c. The communication unit 16 has the function of performing communication with the PC 2b and other PLCs 1.

Figure 2:
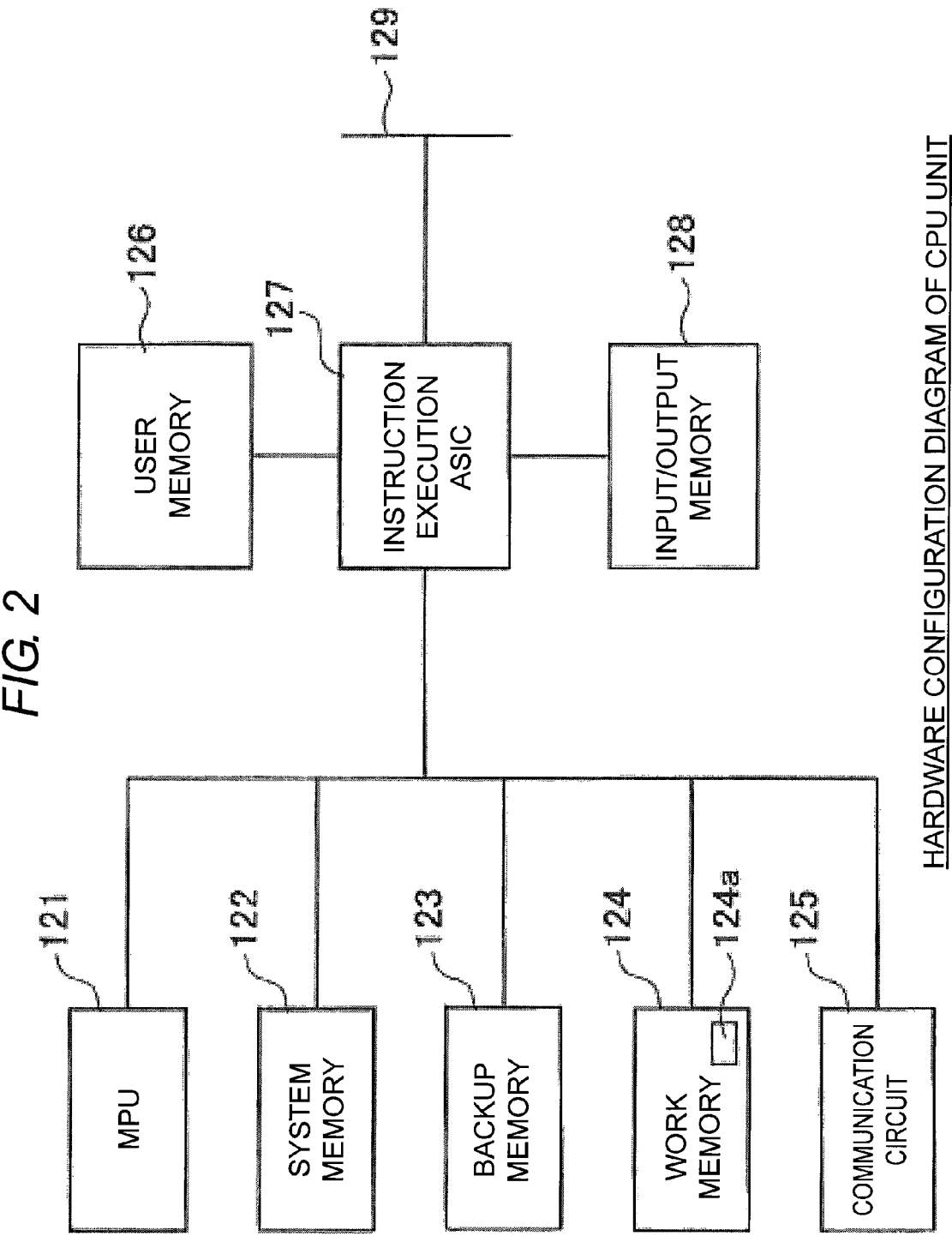
FIG. 2 is a hardware configuration diagram of a CPU unit.

A hardware configuration diagram of a CPU unit of a PLC is shown in FIG. 2. As shown in the drawing, the CPU unit 12 includes an MPU 121, a system memory 122, a backup memory 123, a work memory 124, a fixed cycle time register 124a provided in the work memory 124, a communication circuit 125, a user memory 126, an instruction execution ASIC 127, an input/output memory 128, and an I/O bus 129.

The MPU 121 performs overall control of the entire CPU unit 12. The system memory 122 and the backup memory 123 are configured by nonvolatile memories. The system memory 122 stores a system program which is processed by the MPU 121 to implement functionality as a PLC 1. The backup memory 123 stores a backed up user program.

The work memory 124 stores various data for the entire process of the MPU 121. The work memory 124 also stores data for calculating fixed cycle time that makes the time required for a series of a plurality of system processes which are repeatedly performed by the PLC 1 fixed.

The fixed cycle time register 124a provided in the work memory 124 stores a set value of fixed cycle time. The set value is arbitrarily rewritable. One or a plurality of fixed cycle time registers 124a may be provided.

The communication circuit 125 performs data communication with the PC 2a. The CPU unit 12 performs data communication with the PC 2a through the communication circuit 125.

The user memory 126 stores, at power-on, a user program which is transferred from the backup memory 123, and the user program read therefrom is executed. The instruction execution ASIC 127 is a piece of hardware that reads in turn the user program from the user memory 126 and writes results of the execution to the input/output memory 128.

The input/output memory 128 has an input data storage area for storing input data which is captured from the input unit 13; and an output data storage area for storing output data to be outputted to the output unit 14.

The I/O bus 129 is used to perform by the CPU unit 12 data communication with the power supply unit 11, the input unit 13, and the output unit 14. Various data communications are performed through the I/O bus 129.

Figure 3:
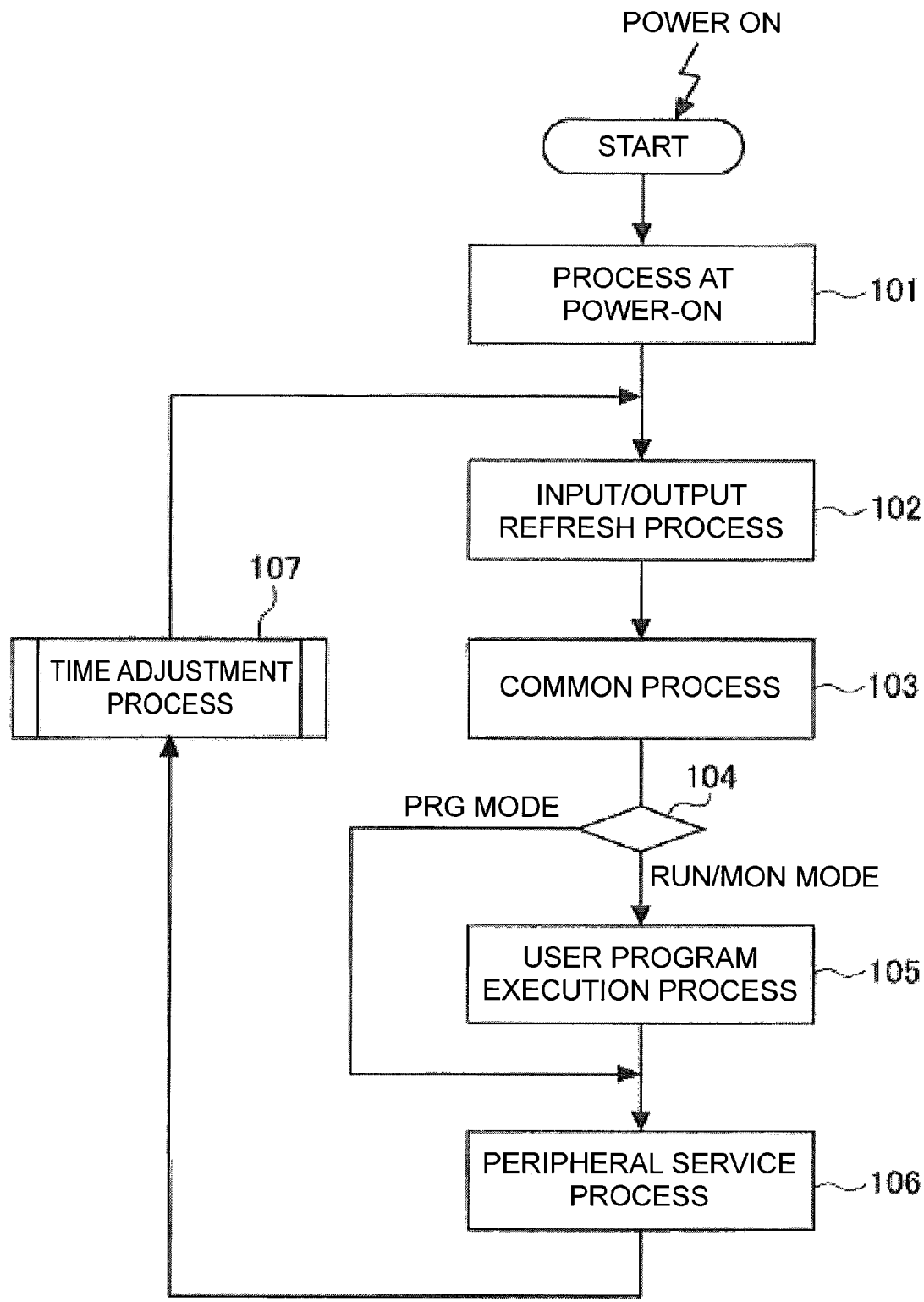
FIG. 3 is a general flowchart schematically showing the entire system program.

The series of a plurality of system processes to be repeatedly performed are implemented by the MPU 121 in the CPU unit 12 executing a predetermined system program stored in the system memory 122. A general flowchart schematically showing the entire system program is shown in FIG. 3. As shown in the drawing, a series of system processes include an input/output refresh process (step 102), a common process (step 103), an operating mode determination process (step 104), a user program execution process (step 105), a peripheral service process (step 106), and a time adjustment process (step 107) which start immediately after the power is turned on and which are cyclically performed in a loop after a process at power-on (step 101) is performed.

In the process at power-on (step 101), an initialization process of the work memory 124, an initialization process of the input/output memory 128, a process of transferring a user program stored in the backup memory 123 to the user memory 126, a process of reserving the fixed cycle time register 124a which is a rewrite area of a set value of fixed cycle time in the work memory 124, etc., are performed.

In the input/output refresh process (step 102), input data is captured from the input unit 13 and written to a predetermined input data storage area of the input/output memory 128 and output data stored in a predetermined output data storage area of the input/output memory 128 is outputted to the output unit 14.

In the common process (step 103), a diagnosis as to whether the PLC is not broken down, checking of various settings used by the MPU 121 to perform a series of system processes, etc., are mainly performed. The contents of the diagnosis include checking on the user memory 126, checking on the I/O bus 129, checking on whether a memory card is attached, etc.

After the common process (step 103) is performed, the process of determining an operating mode of the PLC 1 (step 104) is performed. The operating modes of the PLC 1 include a RUN mode, a MON mode, and a PRG mode. The details of each operating mode will be described later.

If it is determined that the operating mode of the PLC 1 is the PRG mode, then processing proceeds to the peripheral service process (step 106) without performing the user program execution process (step 105). On the other hand, if it is determined that the operating mode of the PLC 1 is the RUN mode or the MON mode, then the user program execution process (step 105) is performed.

In the user program execution process (step 105), a user program execution process is performed by sequentially reading instructions which form the user program stored in the user memory 126 and referring to the input data stored in the predetermined input area of the input/output memory 128. Then, results of the execution are rewritten as output data to be stored in the predetermined output area of the input/output memory 128.

In the peripheral service process (step 106), in response to various commands which are directly transmitted from the PC 2b over the network 3 or from the PC 2a, a process of rewriting data stored in the user memory 126 or/and the input/output memory 128 is performed. The process of rewriting data stored in the user memory 126 includes a process of allowing a change to the user program stored in the user memory 126. In addition to the above, an input/output process of a user interface, a process of communicating with various remote devices, etc., a process of accessing a memory card inserted in the CPU unit 12, etc., are appropriately performed.

When the peripheral service process is completed, the time adjustment process (step 107) is performed. Detailed flowcharts of the time adjustment process are shown in FIGS. 4 and 5.

Figure 4:
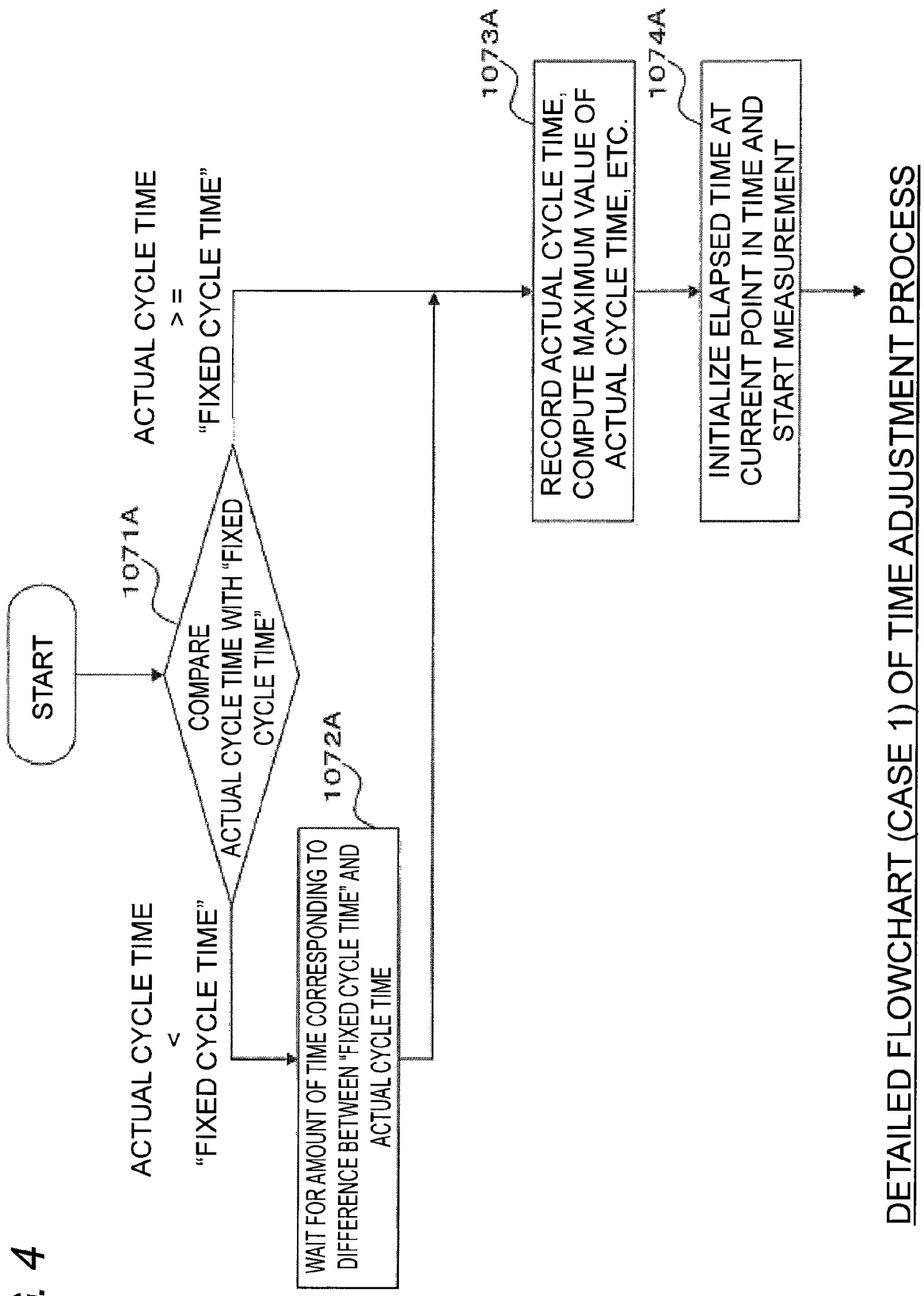
FIG. 4 is a detailed flowchart (case 1) of a time adjustment process.
Figure 5:
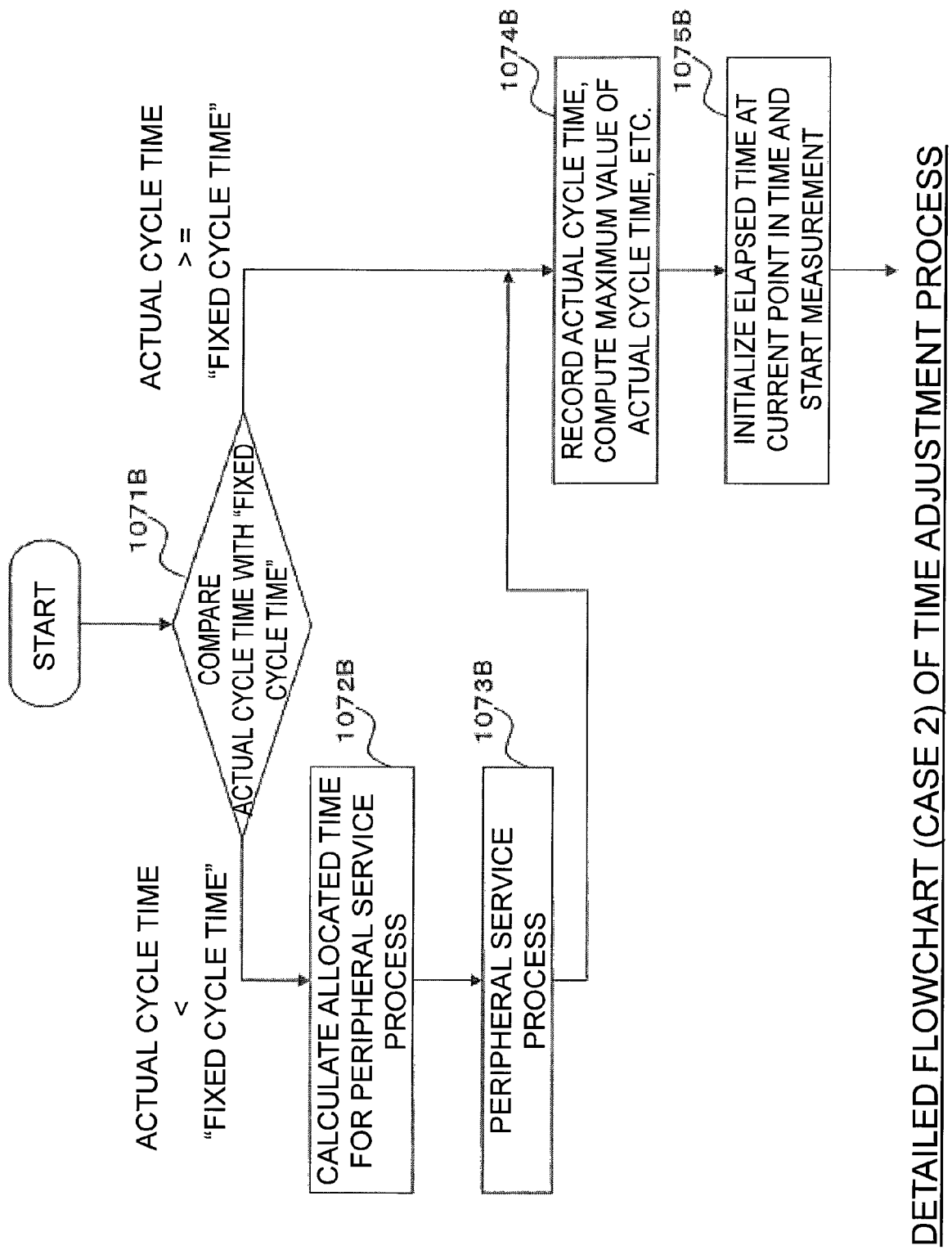
FIG. 5 is a detailed flowchart (case 2) of a time adjustment process.

In a detailed flowchart (case 1) of a time adjustment process in FIG. 4, when a time adjustment process starts, a comparison is made between actual cycle time and fixed cycle time to determine which one of them is greater (step 1071A). As used herein, the actual cycle time indicates the measured elapsed time from the start of an input/output refresh process to the completion of a system process which is performed immediately previous to a next input/output refresh process.

If it is determined that the fixed cycle time is greater than the actual cycle time, then an amount of time corresponding to a difference between the fixed cycle time and the actual cycle time is waited (step 1072A), the value of the actual cycle time is recorded and saved in a predetermined area of the work memory 124 as a sample value (step 1073A), and elapsed time is initialized and a next input/output refresh process starts and at the same time measuring of elapsed time starts (step 1074A). Note that instead of the process of waiting for an amount of time corresponding to a difference between the fixed cycle time and the actual cycle time in step 1072A, a process of waiting until the elapsed time becomes equal to the fixed cycle time may be performed.

On the other hand, if the actual cycle time is greater than the fixed cycle time, then the value of the actual cycle time is recorded and saved in a predetermined area of the work memory 124 as a sample value and computation of a maximum value among the values of the actual cycle time, etc., are performed (step 1073A) and elapsed time is initialized and a next input/output refresh process starts and at the same time measuring of elapsed time starts (step 1074A).

Namely, in the time adjustment process, when it is determined that the fixed cycle time is greater than the actual cycle time, a process of delaying the point in time at which a next input/output refresh process starts by an amount of time corresponding to a difference between the times is performed. On the other hand, when the actual cycle time is greater than the fixed cycle time, a next input/output refresh process immediately starts.

FIG. 5 shows a detailed flowchart (case 2) of another time adjustment process. As shown in the drawing, when a time adjustment process starts, a comparison is made between actual cycle time and fixed cycle time to determine which one of them is greater (step 1071B). If it is determined that the fixed cycle time is greater than the actual cycle time, then a difference between the actual cycle time and the fixed cycle time is computed to calculate time allocated to a peripheral service process (step 1072B) and the peripheral service process is continuously performed until the calculated allocated time for the peripheral service process has elapsed. Note, however, that if there is no peripheral service process to be performed, then a waiting state continues until the allocated time has elapsed (step 1073B). When the allocated time for the peripheral service process has elapsed, the value of the actual cycle time is recorded and saved in a predetermined area of the work memory 124 as a sample value and then computation of a maximum value among the values of the actual cycle time, etc., are performed (step 1074B) and elapsed time is initialized and an input/output refresh process starts and at the same time measuring of elapsed time starts (step 1075B).

On the other hand, if the actual cycle time is greater than the fixed cycle time, then the value of the actual cycle time is recorded and saved in a predetermined area of the work memory 124 as a sample value and computation of a maximum value among the values of the actual cycle time, etc., are performed (step 1074B) and elapsed time is initialized and a next input/output refresh process starts and at the same time measuring of elapsed time starts (step 1075B).

Here, the contents of the aforementioned series of system processes vary depending on the operating mode of the PLC 1, which is shown in a comparative table between the operating modes of the PLC 1 in FIG. 11. As shown in the drawing, when the operating mode of the PLC 1 is the RUN mode, with a change to a user program stored in the user memory 126 in a peripheral service process being prohibited, a series of system processes are repeatedly performed.

On the other hand, when the operating mode of the PLC 1 is the MON mode, with a change to a user program stored in the user memory 126 in a peripheral service process being allowed, a series of system processes are repeatedly performed.

When the operating mode of the PLC 1 is the PRG mode, too, with a change to a user program stored in the user memory 126 in a peripheral service process being allowed, a series of system processes except for at least a user program execution process are repeatedly performed.

Therefore, in the MON mode with a control target device being put in a test run state, while the fixed cycle time is minutely adjusted by operating an operating device such as a tool apparatus or a programmable display, for example, the value of an appropriate parameter correlated to the throughput of the control target device is monitored, whereby fixed cycle time at which the control target device side can obtain optimum throughput can be found and set as new fixed cycle time.

At that time, by also using the function of rewriting a user program (e.g., so-called online editing, etc.) or the function of rewriting the input/output memory (e.g., a forced set/reset operation of input/output data, etc.), the user program can be modified so that the control target device side can obtain optimum throughput.

Moreover, since the above-described change operation to the fixed cycle time can be performed with the control target device maintaining an operating state (test run), unlike traditional programmable controllers, there is no need to switch the control target device between an operating state and a stop state every time a change operation is performed. Accordingly, there is also no need to perform time-consuming pre-processing operations which are associated with switching from an operating state to a stop state, enabling to accomplish the optimization of the fixed cycle time in a short period of time.

A comparison result between actual cycle time and fixed cycle time in a time adjustment process may be monitored by the PC 2a by providing a predetermined internal flag in the input/output memory 128. According to such an embodiment, while the fixed cycle time is minutely adjusted during operation, an influence thereby is checked, whereby fixed cycle time which is optimum also in terms of an improvement in input/output responsiveness can be found.

Fixed cycle time can be changed to a new set value of fixed cycle time which is inputted from the PC 2b which functions as a tool through the communication unit 16. Note that a set value of fixed cycle time may be inputted from the PC 2a which functions as a tool through the communication circuit 125 or from other PLCs 1.

A series of processes for changing to a new set value of fixed cycle time will be described with reference to FIGS. 6 to 10.

Figure 6:
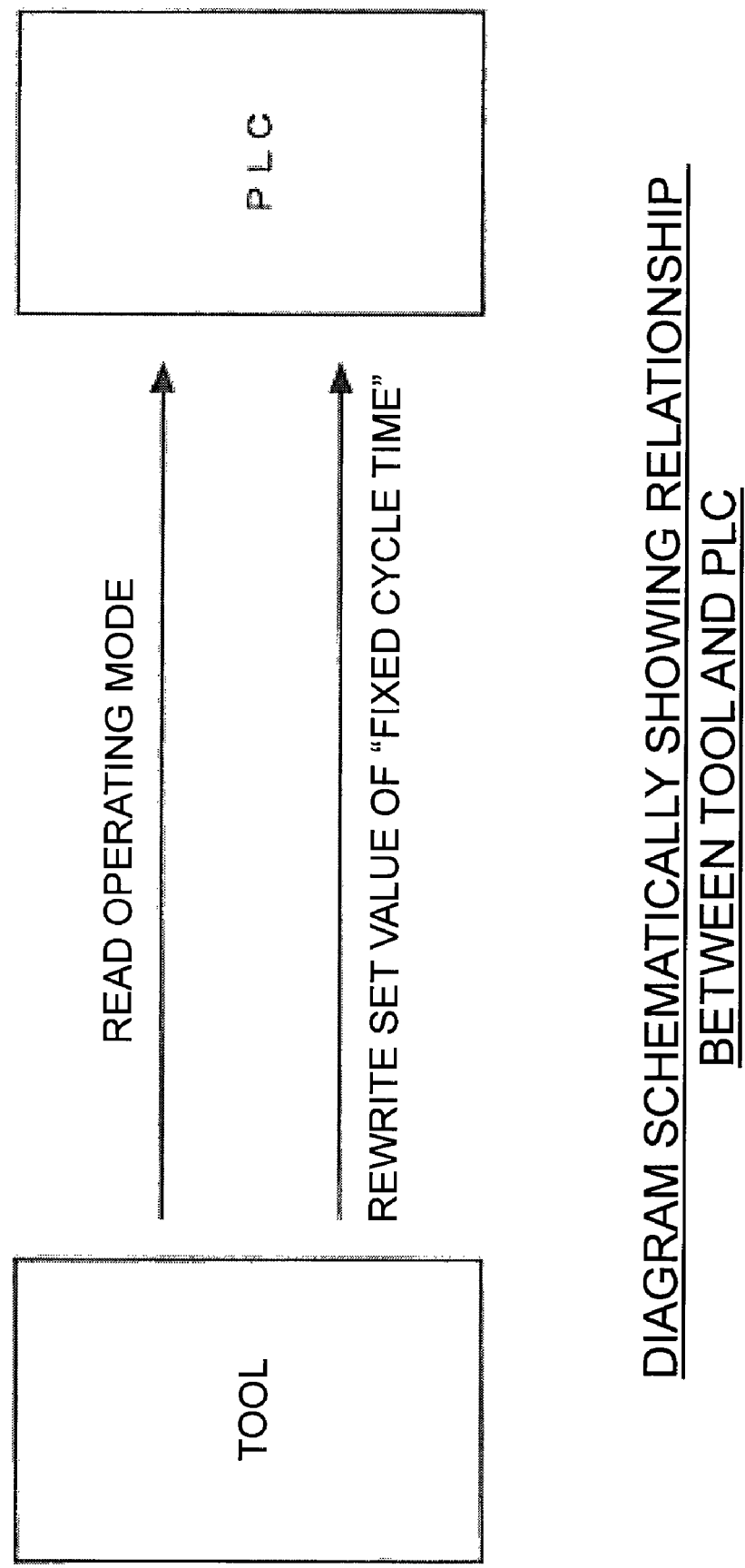
FIG. 6 is a diagram schematically showing the relationship between a tool and a PLC.

FIG. 6 is a diagram schematically showing the relationship between a tool and a PLC. As described previously, in the present invention, whether or not to allow a change to the set value of fixed cycle time is determined depending on the operating mode of the PLC 1. As shown in the drawing, first, the tool reads an operating mode of the PLC 1. Only when the operating mode is an allowed one, a rewrite of the set value of fixed cycle time is performed. Detailed contents of processes performed by the tool and the PLC 1 will be described below.

Figure 7:
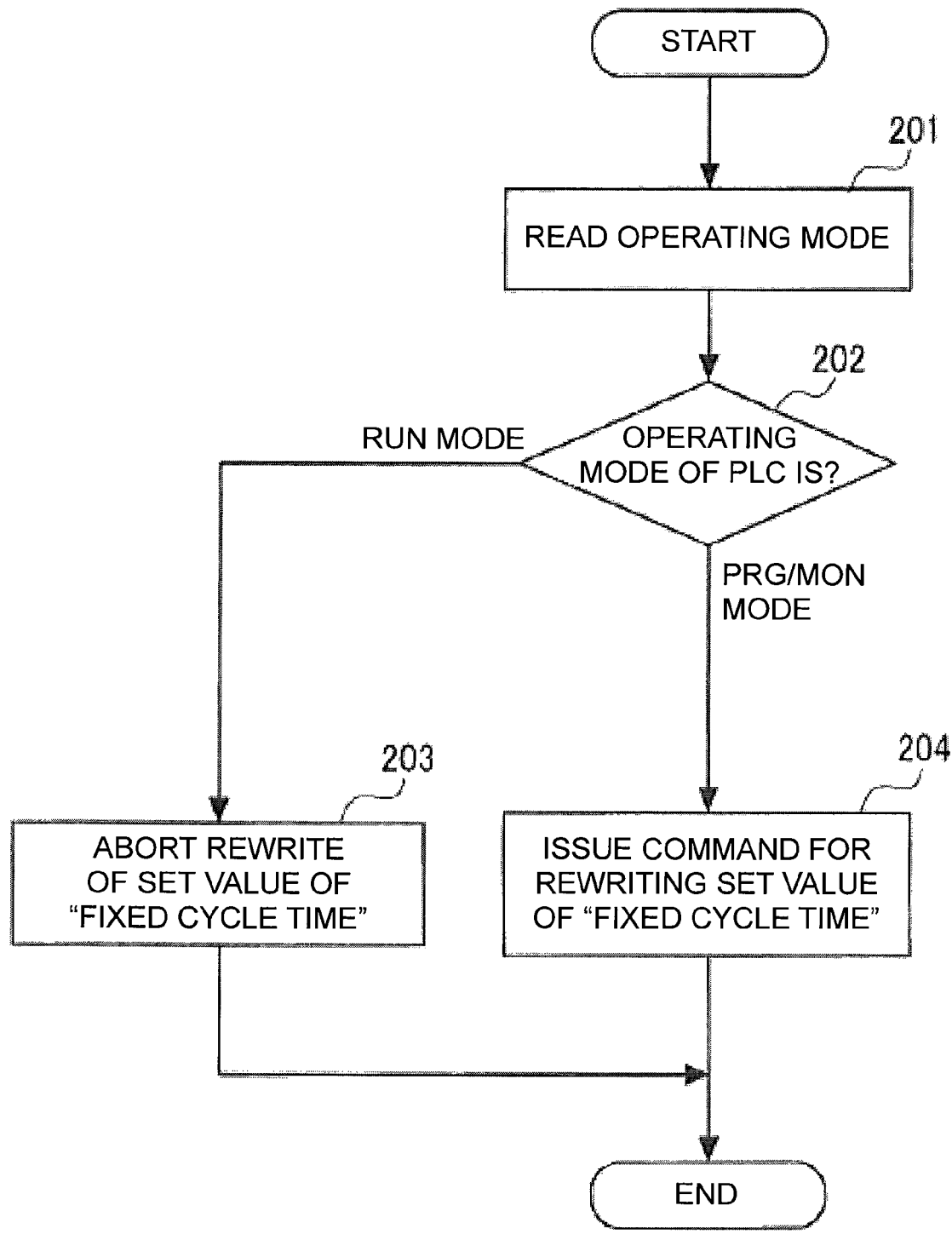
FIG. 7 is a detailed flowchart showing a process of setting a set value of fixed cycle time by the tool.

A detailed flowchart showing a process of setting a set value of fixed cycle time by the tool is shown in FIG. 7. In the drawing, when an operation to set a set value of fixed cycle time is performed, a process starts. The operation to set a set value of fixed cycle time is performed by a user making a selection from a plurality of setting items on a fixed cycle time setting screen shown in FIG. 10 or by the tool automatically making a selection from the plurality of setting items. The contents of the setting items for the set value of fixed cycle time will be described in detail later.

Referring back to FIG. 7, when the process by the tool starts, reading of an operating mode of the PLC 1 is performed (step 201) and the operating mode of the PLC 1 is determined (step 202). If it is determined that the read operating mode of the PLC 1 is the RUN mode, then a rewrite of the set value of fixed cycle time is aborted and the process ends (step 203).

On the other hand, if it is determined that the read operating mode of the PLC 1 is the MON mode or the PRG mode, then a command for rewriting the set value of fixed cycle time is issued and transmitted to the PLC 1 and the process ends (step 204).

Figure 8:
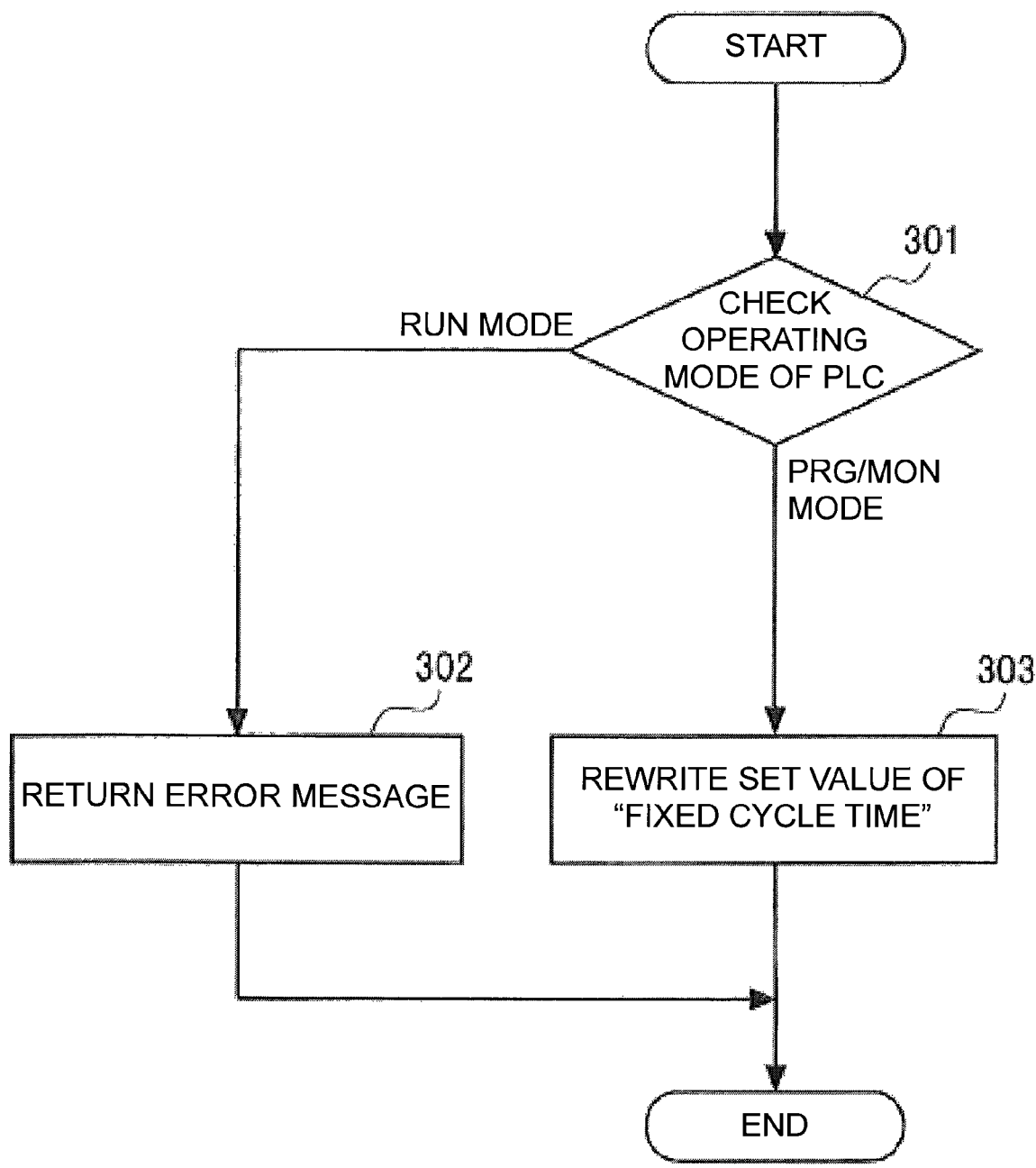
FIG. 8 is a detailed flowchart showing a process of rewriting the set value of fixed cycle time by the PLC.

When the PLC 1 receives the command for rewriting the set value of fixed cycle time, a process for the command is performed at predetermined timing. The process of rewriting the set value of fixed cycle time is normally performed as one process that is included in a peripheral service process. A detailed flowchart showing a process of rewriting the set value of fixed cycle time by the PLC 1 is shown in FIG. 8. As shown in the drawing, when a process of rewriting the set value of fixed cycle time by the PLC 1 starts, an operating mode of the PLC 1 is checked (step 301).

If the operating mode of the PLC 1 is the RUN mode, then an error message indicating that a rewrite of the set value of fixed cycle time is not allowed is issued and the process ends (step 302). On the other hand, if the operating mode of the PLC 1 is the MON mode or the PRG mode, then the set value of fixed cycle time which is stored in the fixed cycle time register 124a reserved in the work memory 124 is rewritten and the process ends (step 303).

In this embodiment, by sending in new fixed cycle time from a tool apparatus (a personal computer, a programmable display, etc.) which is provided for the PLC 1 or from a tool apparatus or other PLCs 1 connected through the communication unit 16, the setting of fixed cycle time can be changed.

Fixed cycle time can be changed not only to a set value sent from an apparatus external to the PLC 1 but also to a new set value of fixed cycle time which is automatically generated in the PLC 1 in accordance with a predetermined algorithm.

The algorithm is stored in, for example, the system memory 122 and generates a set value of fixed cycle time based on sample values of actual cycle time for a certain period of time or a certain number of cycles in the past, in accordance with user-specified conditions. An example of the algorithm includes implementation of a combination of changing timing and a computation method in FIG. 9 as a program. An example of the user-specified conditions includes a combination of changing timing and a computation method in FIG. 9.

According to such an embodiment, by arbitrarily adopting, as the algorithm, an algorithm suitable for a certain programmable controller or suitable for a certain control target device, different fixed cycle time suitable for different control states at different times can be set.

Figure 10:
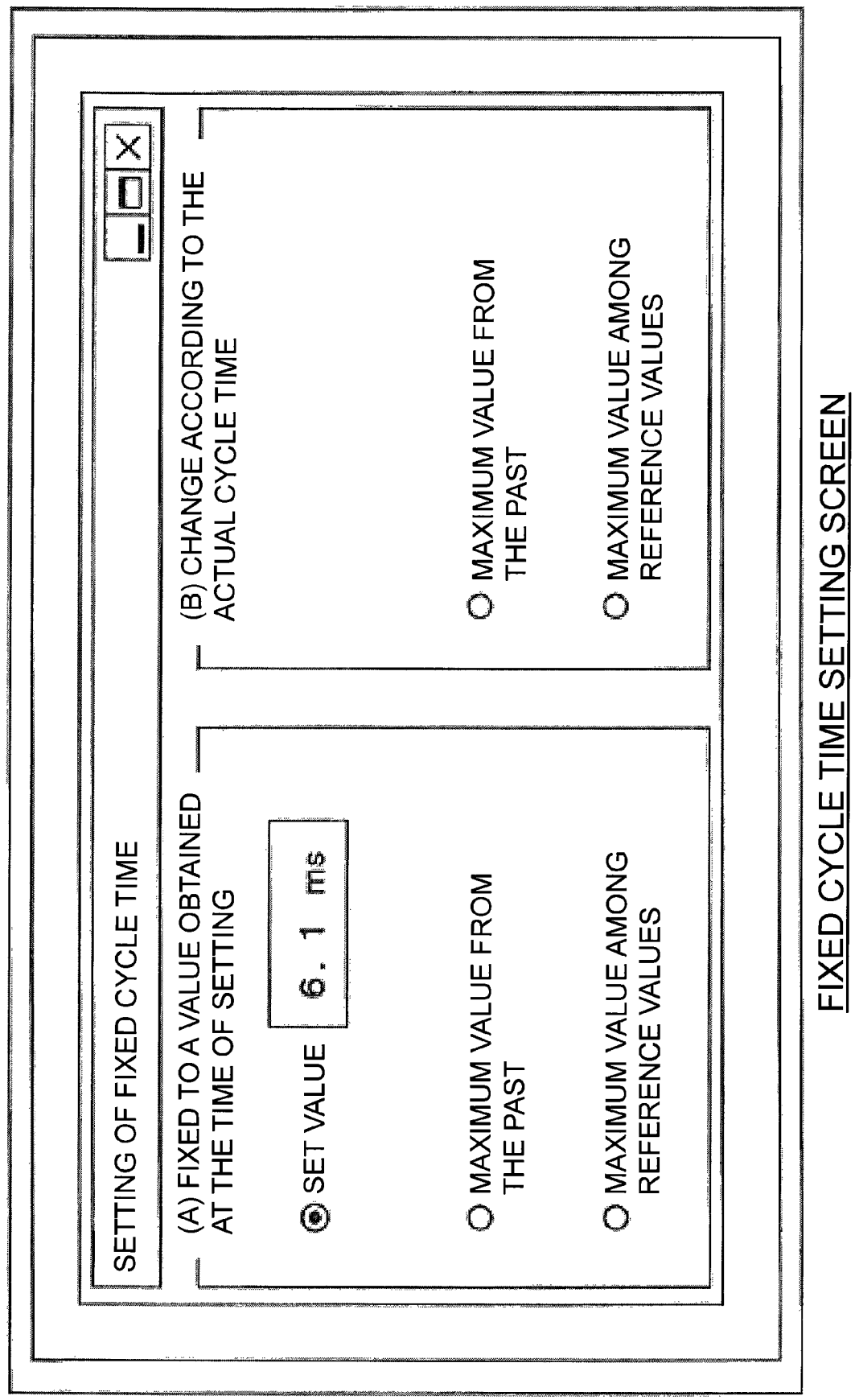
FIG. 10 is a diagram showing a fixed cycle time setting screen.

Detailed description of the setting items on the fixed cycle time setting screen in FIG. 10 is shown in FIG. 9. The drawing shows, in a table format, the changing timings and computation methods of the set value of fixed cycle time.

FIG. 9A shows an example of the changing timing of the set value of fixed cycle time. As shown in the drawing, in the setting (A) of "fixed to a value obtained at the time of setting", when the set value of fixed cycle time is changed to one that is set by user's specification, the set value of fixed cycle time is fixed to the current one until a next change is made. By providing such a setting item, the setting of the set value of fixed cycle time can be changed at user's desired timing.

On the other hand, in the setting (B) of "change according to the actual cycle time", the set value of fixed cycle time changes every time a new set value of fixed cycle time is generated by a predetermined computation method due to a change in the actual cycle time as a result of a change in a user program, etc. By providing such a setting item, the setting of the set value of fixed cycle time can be automatically changed on the PLC side.

FIG. 9B shows an example of the computation method of the set value of fixed cycle time. As shown in the drawing, the setting items for the computation method include "user's arbitrary value", "maximum value from the past", and "maximum value among reference values".

In the setting of "user's arbitrary value", for example, as shown in FIG. 10, a value inputted by the user him/herself as a set value is directly set as the set value of fixed cycle time.

In the setting of "maximum value from the past", a maximum value among sample values of the actual cycle time for a certain period of time or a certain number of cycles in the past is set as the set value of fixed cycle time. In this setting, a sample value obtained when the actual cycle time has unexpectedly and abnormally increased is also included.

By combining the setting of "maximum value from the past" and the setting of "change according to the actual cycle time", when, for example, a user program is partially rewritten (added) by online editing, the setting can be automatically changed to fixed cycle time that is suitable for a new user program obtained after the rewrite, which saves the user from having to perform an operation to rewrite the set value of fixed cycle time each time an online editing operation is performed.

In the setting of "maximum value among reference values", a maximum value among predetermined reference values of sample values of the actual cycle time for a certain period of time or a certain number of cycles in the past is set as the set value of fixed cycle time. In this setting, those sample values that are obtained when the actual cycle time has unexpectedly and abnormally increased and that are out of the predetermined reference values can be excluded. An example of the predetermined reference values includes a range of values within which 90% of sample values obtained in the past 500 cycles fall.

By combining the setting of "maximum value among reference values" and the setting of "change according to the actual cycle time", inconvenience can be avoided that an abnormal maximum value happens to be included in a sample value history due to an unexpected, low-frequency event interrupt, etc., and the value of fixed cycle time is unnecessarily and automatically set to a too high value, whereby input/output responsiveness is extremely impaired.

In the above-described embodiment, an input/output refresh process is described as one integrated process, as shown in FIG. 3. In another embodiment, an input/output refresh process may be divided into an input refresh process in which input data is captured from an external input/output unit and the input data is written to an input data storage area of an input/output memory; and an output refresh process in which output data is loaded from an output data storage area of the input/output memory and the output data is sent into the external input/output unit. A series of a plurality of system processes in this case include an input refresh process, an output refresh process, a common process, a user program execution process, and a peripheral service process. Therefore, the order of the input refresh process and the output refresh process may be reversed and another system process may be included between the processes. For example, the first one of a series of a plurality of system processes may be an output refresh process and the last one may be a peripheral service process. In this case, elapsed time to be measured in a time adjustment process is the time from the point in time at which the output refresh process starts to the point in time at which the peripheral service process completes.

According to the present invention, with a control target device being put in a test run state, while the fixed cycle time is minutely adjusted, fixed cycle time at which the control target device side can obtain optimum throughput can be found and set as new fixed cycle time.

What is claimed is:

1. A programmable controller comprising:
an external input/output unit connected to a control target device;
a user memory that stores a user program for operating the control target device;
an input/output memory that stores input/output data corresponding to external input/output signals from/to the external input/output unit; and
a system memory having stored therein a system program for implementing functionality as the programmable controller, wherein
the system program stored in the system memory includes a series of a plurality of system processes to be repeatedly performed, and the plurality of system processes include at least:
an input/output refresh process in which input data is captured from the external input/output unit and written to an input data storage area of the input/output memory, and output data is loaded from an output data storage area of the input/output memory and sent into the external input/output unit;
a user program execution process in which instructions which form the user program are sequentially read from the user memory, and the instructions are executed by referring to the input data in the input/output memory and the output data in the input/output memory is rewritten based on results of the execution; and
a peripheral service process including a process of allowing a change to the user program in response to a command coming from a predetermined tool apparatus through communication,
the peripheral service process comprising an operational mode in which the control target device can operate and a non-operational mode in which the control target device cannot operate are prepared,
wherein, in the operational mode, the series of a plurality of system processes are repeatedly performed,
in the non-operational mode, the series of a plurality of system processes except for at least the user program execution process are repeatedly performed,
the system program further includes a time adjustment process including:
a measurement process in which, when the series of a plurality of system processes are repeatedly performed, elapsed time from a start of the input/output refresh process to completion of a system process to be performed immediately previous to a next input/output refresh process is measured as an actual cycle time;
a determination process in which a comparison is made between the actual cycle time measured in the measurement process and a fixed cycle time to determine which one of them is greater; and
a selection delaying process in which when it is determined in the determination process that the fixed cycle time is greater than the actual cycle time, a point in time at which the next input/output refresh process starts is delayed by an amount of time corresponding to a difference between the fixed cycle time and the actual cycle time, and when it is determined in the determination process that the actual cycle time is greater than the fixed cycle time, the next input/output refresh process immediately starts, and wherein the selection delaying process allows a change to the fixed cycle time to be compared with the actual cycle time not only in the non-operational mode but also in the operational mode.

2. A programmable controller, comprising:

an external input/output unit connected to a control target device;

a user memory that stores a user program for operating the control target device;

an input/output memory that stores input/output data corresponding to external input/output signals from/to the external input/output unit; and a system memory having stored therein a system program for implementing functionality as the programmable controller, wherein the system program stored in the system memory includes a series of a plurality of system processes to be repeatedly performed, and the plurality of system processes include at least:

an input/output refresh process in which input data is captured from the external input/output unit and written to an input data storage area of the input/output memory, and output data is loaded from an output data storage area of the input/output memory and sent into the external input/output unit;

a user program execution process in which instructions which form the user program are sequentially read from the user memory, and the instructions are executed by referring to the input data in the input/output memory and the output data in the input/output memory is rewritten based on results of the execution; and a peripheral service process including a process of allowing a change to the user program in response to a command coming from a predetermined tool apparatus through communication, the peripheral service process comprising an operational mode in which the control target device can operate and a non-operational mode in which the control target device cannot operate are prepared, wherein, in the operational mode, the series of a plurality of system processes are repeatedly performed, in the non-operational mode, the series of a plurality of system processes except for at least the user program execution process are repeatedly performed, the system program further includes a time adjustment process including:

a measurement process in which, when the series of a plurality of system processes are repeatedly performed, elapsed time from a start of the input/output refresh process to completion of a system process to be performed immediately previous to a next input/output refresh process is measured as an actual cycle time;

a determination process in which a comparison is made between the actual cycle time measured in the measurement process and a fixed cycle time to determine which one of them is greater;

a selection delaying process in which when it is determined in the determination process that the fixed cycle time is greater than the actual cycle time, a point in time at which the next input/output refresh process starts is delayed by an amount of time corresponding to a difference between the fixed cycle time and the actual cycle time, and when it is determined in the determination process that the actual cycle time is greater than the fixed cycle time, the next input/output refresh process immediately starts, wherein the selection delaying process allows a change to the fixed cycle time to be compared with the actual cycle time not only in the non-operational mode but also in the operational mode;

wherein as the operational mode, a first operational mode and a second operational mode are prepared, in the first operational mode (RUN), the series of a plurality of system processes are repeatedly performed with a change to the user program in the peripheral service process being not allowed, in the second operational mode (MON), the series of a plurality of system processes are repeatedly performed with a change to the user program in the peripheral service process being allowed, in the non-operational mode (PRG), the series of a plurality of system processes except for at least the user program execution process are repeatedly performed with a change to the user program in the peripheral service process being allowed, and a change to the fixed cycle time to be compared with the actual cycle time is prohibited in the first operational mode but is allowed in the second operational mode and the non-operational mode.

3. The programmable controller according to claim 2, wherein the selection delaying process is configured to change the fixed cycle time to a new fixed cycle time inputted from an external source.

4. The programmable controller according to claim 2, wherein the selection delaying process is configured to change the fixed cycle time to a new fixed cycle time that is automatically generated in the programmable controller in accordance with a predetermined algorithm.

5. The programmable controller according to claim 1, wherein the selection delaying process is configured to change the fixed cycle time to a new fixed cycle time inputted from an external source.

6. The programmable controller according to claim 1, wherein the selection delaying process is configured to change the fixed cycle time to a new fixed cycle time that is automatically generated in the programmable controller in accordance with a predetermined algorithm.

7. The programmable controller according to claim 6, wherein the predetermined algorithm generates the new fixed cycle time, based on a maximum value among sample values of the actual cycle time for a certain period of time or a certain number of cycles in past.

8. A programmable controller, comprising:

an external input/output unit connected to a control target device;

a user memory that stores a user program for operating the control target device;

an input/output memory that stores input/output data corresponding to external input/output signals from/to the external input/output unit; and a system memory having stored therein a system program for implementing functionality as the programmable controller, wherein the system program stored in the system memory includes a series of a plurality of system processes to be repeatedly performed, and the plurality of system processes include at least:

an input/output refresh process in which input data is captured from the external input/output unit and written to an input data storage area of the input/output memory, and output data is loaded from an output data storage area of the input/output memory and sent into the external input/output unit;

a user program execution process in which instructions which form the user program are sequentially read from the user memory, and the instructions are executed by referring to the input data in the input/output memory and the output data in the input/output memory is rewritten based on results of the execution; and a peripheral service process including a process of allowing a change to the user program in response to a command coming from a predetermined tool apparatus through communication, the peripheral service process comprising an operational mode in which the control target device can operate and a non-operational mode in which the control target device cannot operate are prepared, wherein, in the operational mode, the series of a plurality of system processes are repeatedly performed, in the non-operational mode, the series of a plurality of system processes except for at least the user program execution process are repeatedly performed, the system program further includes a time adjustment process including:

a measurement process in which, when the series of a plurality of system processes are repeatedly performed, elapsed time from a start of the input/output refresh process to completion of a system process to be performed immediately previous to a next input/output refresh process is measured as an actual cycle time;

a determination process in which a comparison is made between the actual cycle time measured in the measurement process and a fixed cycle time to determine which one of them is greater; and a selection delaying process in which when it is determined in the determination process that the fixed cycle time is greater than the actual cycle time, a point in time at which the next input/output refresh process starts is delayed by an amount of time corresponding to a difference between the fixed cycle time and the actual cycle time, and when it is determined in the determination process that the actual cycle time is greater than the fixed cycle time, the next input/output refresh process immediately starts, wherein the selection delaying process allows a change to the fixed cycle time to be compared with the actual cycle time not only in the non-operational mode but also in the operational mode;

wherein the fixed cycle time can be changed to a new fixed cycle time which is automatically generated in the programmable controller in accordance with a predetermined algorithm;

wherein the predetermined algorithm generates the new fixed cycle time, based on a maximum value among sample values of the actual cycle time for a certain period of time or a certain number of cycles in past;

wherein a sample value that is out of predetermined reference values is excluded from the sample values of the actual cycle time for a certain period of time or a certain number of cycles in past.

9. A programmable controller, comprising:

an external input/output unit connected to a control target device;

a user memory that stores a user program for operating the control target device;

an input/output memory that stores input/output data corresponding to external input/output signals from/to the external input/output unit; and a system memory having stored therein a system program for implementing functionality as the programmable controller, wherein the system program stored in the system memory includes a series of a plurality of system processes to be repeatedly performed, and the plurality of system processes include at least:

an input/output refresh process in which input data is captured from the external input/output unit and written to an input data storage area of the input/output memory, and output data is loaded from an output data storage area of the input/output memory and sent into the external input/output unit;

a user program execution process in which instructions which form the user program are sequentially read from the user memory, and the instructions are executed by referring to the input data in the input/output memory and the output data in the input/output memory is rewritten based on results of the execution; and a peripheral service process including a process of allowing a change to the user program in response to a command coming from a predetermined tool apparatus through communication, the peripheral service process comprising an operational mode in which the control target device can operate and a non-operational mode in which the control target device cannot operate are prepared, in the operational mode, the series of a plurality of system processes are repeatedly performed, wherein, in the non-operational mode, the series of a plurality of system processes except for at least the user program execution process are repeatedly performed, the system program further includes a time adjustment process including:

a measurement process in which, when the series of a plurality of system processes are repeatedly performed, elapsed time from a start of the input/output refresh process to completion of a system process to be performed immediately previous to a next input/output refresh process is measured as an actual cycle time;

a determination process in which a comparison is made between the actual cycle time measured in the measurement process and a fixed cycle time to determine which one of them is greater;

a selection delaying process in which when it is determined in the determination process that the fixed cycle time is greater than the actual cycle time, a point in time at which the next input/output refresh process starts is delayed by an amount of time corresponding to a difference between the fixed cycle time and the actual cycle time, and when it is determined in the determination process that the actual cycle time is greater than the fixed cycle time, the next input/output refresh process immediately starts, wherein the selection delaying process allows a change to the fixed cycle time to be compared with the actual cycle time not only in the non-operational mode but also in the operational mode;

wherein the input/output refresh process is divided into an input refresh process in which input data is captured from the external input/output unit and written to the input data storage area of the input/output memory; and an output refresh process in which output data is loaded from the output data storage area of the input/output memory and sent into the external input/output unit, in the measurement process, when the series of a plurality of system processes are repeatedly performed, elapsed time from a start of the output refresh process to completion of a system process to be performed immediately previous to a next output refresh process is measured as actual cycle time, and in the selection delaying process, when it is determined in the determination process that the fixed cycle time is greater than the actual cycle time, a point in time at which the next output refresh process starts is delayed by an amount of time corresponding to a difference between the times, and when it is determined in the determination process that the actual cycle time is greater than the fixed cycle time, the next output refresh process immediately starts.

* * * * *